US011995551B2

United States Patent
Koivisto et al.

(10) Patent No.: US 11,995,551 B2
(45) Date of Patent: May 28, 2024

(54) PRUNING CONVOLUTIONAL NEURAL NETWORKS

(71) Applicant: NVIDIA CORPORATION, Santa Clara, CA (US)

(72) Inventors: Tommi Koivisto, Uusimaa (FI); Pekka Jänis, Uusimaa (FI)

(73) Assignee: NVIDIA Corporation, Santa Clara, CA (US)

( * ) Notice: Subject to any disclaimer, the term of this patent is extended or adjusted under 35 U.S.C. 154(b) by 1170 days.

(21) Appl. No.: 16/246,414

(22) Filed: Jan. 11, 2019

(65) Prior Publication Data
US 2019/0251442 A1    Aug. 15, 2019

Related U.S. Application Data

(60) Provisional application No. 62/630,445, filed on Feb. 14, 2018.

(51) Int. Cl.
*G06N 3/082* (2023.01)
*G06N 5/04* (2023.01)

(52) U.S. Cl.
CPC ............... *G06N 3/082* (2013.01); *G06N 5/04* (2013.01)

(58) Field of Classification Search
None
See application file for complete search history.

(56) References Cited

U.S. PATENT DOCUMENTS

| 10,289,469 | B2 | 5/2019 | Fortino et al. |
| 2016/0321074 | A1 | 11/2016 | Hung et al. |
| 2018/0370540 | A1 | 12/2018 | Yousuf et al. |
| 2019/0212749 | A1 | 7/2019 | Chen et al. |
| 2019/0243371 | A1 | 8/2019 | Nister et al. |
| 2019/0250611 | A1 | 8/2019 | Costin et al. |
| 2019/0250622 | A1 | 8/2019 | Nister et al. |
| 2019/0258251 | A1 | 8/2019 | Ditty et al. |
| 2021/0158166 | A1* | 5/2021 | Azarian Yazdi ....... G06N 3/048 |

OTHER PUBLICATIONS

Li, et al., Pruning Filters for Efficient Convnets, Proceedings of the 5th International Conference on Learning Representations (ICLR'17), 2017, pp. 1-13 (Year: 2017).*
Molchanov, et al., Pruning Convolutional Neural Networks for Resource Efficient Inference, arXiv:1611.06440v2, 2017, pp. 1-17 (Year: 2017).*
Luo, et al., ThiNet: A Filter Level Pruning Method for Deep Neural Network Compression, ICCV 2017, 2017, pp. 5058-5066 (Year: 2017).*
Hubara et al., "Quantized Neural Networks: Training Neural Networks with Low Precision Weights and Activations", https://arxiv.org/abs/1609.07061, 2016, pp. 1-29.

(Continued)

*Primary Examiner* — Wilbert L Starks
(74) *Attorney, Agent, or Firm* — Squire Patton Boggs LLP; Sarah Mirza

(57) ABSTRACT

A neural network includes at least a first network layer that includes a first set of filters and a second network layer that includes a second set of filters. Notably, a filter was removed from the first network layer. A bias associated with a different filter included in the second set of filters compensates for a different bias associated with the filter that was removed from the first network layer.

20 Claims, 7 Drawing Sheets

(56) References Cited

OTHER PUBLICATIONS

Courbariaux et al., "Binarized Neural Networks: Training Deep Neural Networks with Weights and Activations Constrained to +1 or −1", https://arxiv.org/abs/1602.02830, 2016, 11 pages.
Jaderberg et al., "Speeding up Convolutional Neural Networks with Low Rank Expansions", https://arxiv.org/abs/1405.3866, 2014, pp. 1-12.
Lavin et al., "Fast Algorithms for Convolutional Neural Networks", https://arxiv.org/abs/1509.09308, 2015, pp. 1-9.
Han et al., "Learning both Weights and Connections for Efficient Neural Networks", NIPS 2015, https://arxiv.org/abs/1506.02626, 2015, pp. 1-9.
Li et al., "Pruning Filters for Efficient ConvNets", ICLR 2017, https://arxiv.org/abs/1608.08710, ICLR, 2017, pp. 1-13.
Zhou et al., "Less is More: Towards Compact CNNs", ECCV, 2016, pp. 1-16.
Wen et al., "Learning Structured Sparsity in Deep Neural Networks", NIPS 2016, https://arxiv.org/abs/1608.03665, 2016, pp. 1-9.
Alvarez et al., "Learning the Number of Neurons in Deep Networks", NIPS 2016, https://arxiv.org/abs/1611.06321, 2016, pp. 1-9.
Le Cun et al., "Optimal Brain Damage", NIPS 1989, https://papers.nips.cc/paper/250-optimal-brain-damage, 1989, pp. 598-605.
Dong et al., "Learning to Prune Deep Neural Networks via Layer-wise Optimal Brain Surgeon", NIPS 2017, https://arxiv.org/abs/1705.07565, 2017, pp. 1-15.
Molchanov et al., "Pruning Convolutional Neural Networks for Resource Efficient Inference", ICLR 2017, https://arxiv.org/abs/1611.06440, 2017, pp. 1-17.
"Multilayer perceptron", https://en.wikipedia.org/wiki/Multilayer_perceptron, retrieved May 5, 2020, 4 pages.
He et al., "Deep Residual Learning for Image Recognition", https://arxiv.org/pdf/1512.03385.pdf, 2015, pp. 1-12.
Frankle et al., "The Lottery Ticket Hypothesis: Finding Sparse, Trainable Neural Networks", https://arxiv.org/abs/1803.03635, ICLR 2019, pp. 1-42.
Fung, Vincent, "An Overview of ResNet and its Variants", https://towardsdatascience.com/an-overview-of-resnet-and-its-variants-5281e2f56035, Jul. 15, 2017, 15 pages.
Jung et al., "Programmable Vision Accelerator", U.S. Appl. No. 62/156,167, filed May 1, 2015, 73 pages.
Yousuf et al., "Methodology of Using a Single Controller (ECU) For a Fault-Tolerant/Fail-Operational Self-Driving System", U.S. Appl. No. 62/524,283, filed Jun. 23, 2017, 72 pages.
Yousuf et al., "Systems and Methods for Safe and Reliable Autonomous Vehicles" U.S. Appl. No. 62/584,549, filed Nov. 10, 2017, 172 pages.
Provodin et al., "System and Method for Controlling Autonomous Vehicles" U.S. Appl. No. 62/614,466, filed Jan. 7, 2018, 46 pages.
Nister et al., "System and Method for Safe Operation of Autonomous Vehicles", U.S. Appl. No. 62/625,351, filed Feb. 2, 2018, 80 pages.
Nister et al., "Conservative Control for Zone Driving of Autonomous Vehicles", U.S. Appl. No. 62/628,831, filed Feb. 9, 2018, 90 pages.
Costin et al., "Systems and Methods for Sharing Camera Data Between Primary and Backup Controllers in Autonomous Vehicle Systems", U.S. Appl. No. 62/629,822, filed Feb. 13, 2018, 64 pages.

\* cited by examiner

PRUNING CONVOLUTIONAL NEURAL NETWORKS

CROSS-REFERENCE TO RELATED APPLICATIONS

This application claims priority benefit of the United States Provisional Patent Application titled, "PRUNING CONVOLUTIONAL NEURAL NETWORKS FOR AUTONOMOUS VEHICLES AND ROBOTICS," filed on Feb. 14, 2018 and having Ser. No. 62/630,445. The subject matter of this related application is hereby incorporated herein by reference.

BACKGROUND

A neural network may be trained on one or more high performance devices that allocate a relatively large amount of computational resources for training the neural network. Once trained, the neural network may be deployed on one or more endpoint devices in order to perform various inference operations. Many endpoint devices allocate a relatively small amount of computational resources to execute neural networks. Examples of such endpoint devices include, without limitation, mobile devices, embedded devices, and controllers included in automotive systems. Because of the limited amount of available computational resources, a given endpoint device may not be able to successfully execute a given neural network. In an attempt to reduce the computation resources needed to perform inference operations, the neural network may be pruned. However, pruning may introduce sparseness into the neural network such that the amount of computational resources needed for inference may not be sufficiently reduced even after the neural network is pruned. Further, pruning a neural network may unacceptably reduce the accuracy of the inference operations performed using the pruned neural network relative to using the unpruned neural network.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
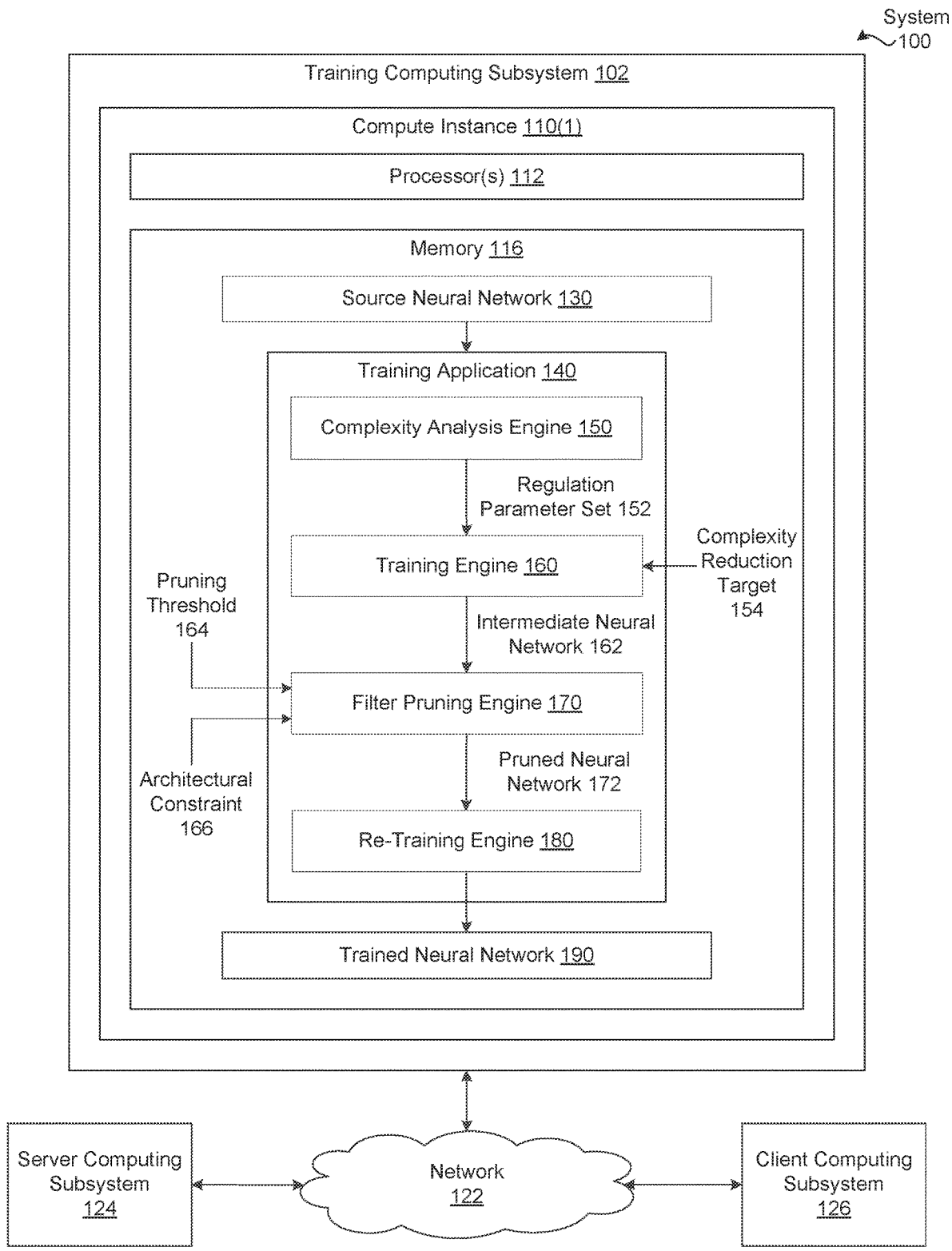
FIG. 1 illustrates a system configured to implement one or more aspects of various embodiments.

FIG. 1 illustrates a system 100 configured to implement one or more aspects of various embodiments. As shown, the system 100 includes, without limitation, a training computing subsystem 102, a server computing subsystem 124, and a client computing subsystem 126 that are communicatively coupled through a network 122. In alternate embodiments, the system 100 may include any number of training computing subsystems 102, any number of server computing subsystems 124, and any number of client computing subsystems 126 that may communicate in any technically feasible fashion using any number of networks 122. For explanatory purposes, multiple instances of like objects are denoted with reference numbers identifying the object and parenthetical numbers or characters identifying the instance where needed.

Any number of the components of the system 100 may be distributed across multiple geographic locations. Further, any number of the components of the system 100 may be included in or distributed across one or more stand-alone devices, distributed computing environments, or cloud computing environments (i.e., encapsulated shared resources, software, data, etc.) in any combination.

In one embodiment, the training computing subsystem 102 includes, without limitation, any number of compute instances 110. Each compute instance 110 includes, without limitation, any number of processor(s) 112 and a memory 116. Examples of compute instances 110 include, without limitation, a server, a cloud instance, a laptop, and a desktop computer. Each of the processor(s) 112 may be any instruction execution system, apparatus, or device capable of executing instructions. For example, each of the processor(s) 112 could be a central processing unit (CPU), a graphics processing unit (GPU), a parallel processing unit (PPU), a controller, a microcontroller, a state machine, or any combination thereof.

In one embodiment, he memory 116 stores content, such as software applications and data, for use by the processor(s) 112 of the compute instance 110. The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor(s) 112. For example, and without limitation, the storage may include a Secure Digital Card, an external Flash memory, a portable compact disc read-only memory (CD-ROM), an optical storage device, a magnetic storage device, or any suitable combination of the foregoing.

In one embodiment, each of the compute instances 110 included in the system 100 is configured to implement one or more applications. For explanatory purposes only, each application and each subsystem is depicted as residing in the memory 116 of a single compute instance 110 and executing on the processor(s) 112 of the single compute instance 110. However, as persons skilled in the art will recognize, the functionality of each application and subsystem may be distributed across any number of other subsystems and/or applications that reside in the memories 116 of any number of the compute instances 110 and execute on any number of the processor(s) 112 of any number of the compute instances 110 in any combination. Further, the functionality of any number of subsystems and/or applications may be consolidated into a single application or subsystem.

In some embodiments, a training application 140 resides in the memory 116 included in the compute instance 110(1) and executes on the processor(s) 112 included in the compute instance 110(1). The training application 140 generates a trained neural network 190 based on a source neural network 130. In general, the source neural network 130 may be any technically feasible type of deep neural network. As referred to herein, a "deep neural network" includes, without limitation, multiple layers of linear transformations followed by non-linear activation functions. The linear transformations typically comprise a multiplication by a weight matrix or a convolution by a weight tensor known as a filter followed by an addition of a bias. Examples of deep neural networks include, without limitation, Long Short Term Memory (LSTM) networks, Gated Recurrent Unit (GRU) networks, and convolutional neural networks (CNNs), to name a few.

In some embodiments, the source neural network 130 is a convolution neural network (CNN) that includes, without limitation, any number of convolutional layers, max-pooling layers, fully connected layers, average pooling layers, and so forth, in any combination. Each of the convolutional layers (not shown in FIG. 1) converts a three-dimensional (3D) input volume into a 3D output volume using any number of three-dimensional (3D) filters. Each volume is organized into two-dimensional arrays of values, where each array comprises a different channel.

In one embodiment, each filter is associated with a different output channel and includes, without limitation, one or more two-dimensional (2D) kernels, where each kernel is associated with a different input channel. Accordingly, for a given convolutional layer, the number of kernels included each filter is equal to the number of input channels associated with the convolutional layer and the number of output channels is equal to the number of filters. Each kernel includes, without limitation, a two-dimensional array of weights and a bias. In alternate embodiments, the architecture of the CNN may vary.

As shown, the training application 140 includes, without limitation, a complexity analysis engine 150, a training engine 160, a filter pruning engine 170, and a re-training engine 180. In one embodiment, the complexity analysis engine 150 generates a regularization parameter set 152 based on the source neural network 130. In one embodiment, the training engine 160 trains the source neural network 130 with regularization based on the regularization parameter set 152 to generate an intermediate neural network 162. Notably, training the source neural network 130 with regularization efficiently decreases the average magnitude of some of the filters. In one embodiment, the filter pruning engine 170 identifies one or more filters in the intermediate neural network 162 having average magnitudes lower than a pruning threshold 164, and generates the pruned neural network 162 that omits the identified filters. In one embodiment, the, the re-training engine 180 trains the pruned neural network 172 without regularization to generate the trained neural network 190.

In alternate embodiments, the training application 140 may execute the training engine 160 and the filter pruning engine 170 in an iterative fashion. During each non-initial iteration x, the training engine 160 trains (with regularization) the pruned neural network 172(x–1) generated by the filter pruning engine 170 during the previous iteration (x–1) to generate the intermediate neural network 162(x).

In one embodiment, the, the complexity analysis engine 150 performs one or more analysis operations to determine a different computation complexity for each convolutional layer included in the source neural network 130. The complexity analysis engine 150 generates the regularization parameter set 150 based on the different computational complexities. The regularization parameter set 150 includes, without limitation, a different regularization parameter for each of the convolutional layers in the source neural network 130. A regularization parameter is also commonly referred to as a regularization weight.

In one embodiment, the complexity analysis engine 150 may compute the computational complexity of each convolutional layer in any technically feasible fashion. In some embodiments, to determine the computational complexity of a given convolutional layer, the complexity analysis engine 150 estimates an inference time associated with the convolutional layer. The complexity analysis engine 150 may estimate the inference times in any technically feasible fashion. For instance, in some embodiments, the complexity analysis engine 150 executes the source neural network 130 on a target deployment, such as the client computing subsystem 126, and measures the inference times associated with each convolutional layer.

In some embodiments, to determine the computational complexity of a given convolutional layer, the complexity analysis engine 150 estimates a number of floating point operations (FLOPs) or fused floating point multiply and add operations (FFMA) associated with the computational layer. The number of operations varies based on a variety of different characteristics of the layers including, without limitation, the number of filters, the size of the filters, and the size of the input volume. In various embodiments, the complexity analysis engine 150 may consider the hardware and/or software architecture of a target deployment, such as the client computing subsystem 126 when determining the computational complexity. For example, if the client computing subsystem 126 is optimized for N×N kernels, then the complexity analysis engine 150 could adjust the operations estimates based on whether the size of each of the kernels is N×N.

In one embodiment, if the computational complexity of a convolutional layer is relatively high, then the training engine 160 sets the associated regularization parameter to a relatively high value. By contrast, if the computational complexity of a convolutional layer is relatively low, then the training engine 160 sets the associated regularization parameter to a relatively low value. As the value of a regularization parameter increases, the amount of regularization that the training engine 160 performs on the associated convolutional layer also increases.

Advantageously, as persons skilled in the art will recognize, increasing the level of regularization typically increases the aggressiveness with which the filter pruning engine 170 removes filters from the intermediate neural network 162. Consequently, by varying the regularization parameter for each convolutional layer, the complexity analysis engine 150 indirectly configures the filter pruning engine 170 to prune convolutional layers having higher computational complexities more aggressively than convolutional layers having lower computational complexities. As a result, performing training with layer-specific regularization parameters instead of a single regularization parameter can more effectively reduce the overall inference time associated with the trained neural network 190.

In one embodiment, the training engine 160 implements any number and type of machine learning techniques (e.g., gradient descent) with regularization to train the source neural network 130, thereby generating the intermediate neural network 162. In some embodiments, the training engine 160 performs the training based on the regularization parameter set 152. In other embodiments, the training engine 160 may acquire any number and type of regularization parameters in any technically feasible fashion, such as via a graphical user interface (GUI).

In one embodiment, the training engine 160 may implement any number of regularization techniques to reduce the average magnitude of one or more of the filters during training. For instance, in some embodiments, the training engine 160 modifies a typical loss term $L_D(x,y,W)$ by an additional regularization loss term $R(W)$ to generate an overall loss term $L(x,y,W)$ using the following equations (1) and (2):

$$L(x, y, W) = L_D(x, y, W) + \lambda R(W) \quad (1)$$

$$R(W) = \left(\sum_i |W_i|^p\right)^{1/p} \quad (2)$$

where the summation index i runs over all elements of the kernels W, $\lambda$ is the associated regularization parameter, and the regularization loss term $R(W)$ is based on the p-norm of the weights (e.g., p is equal to 1 for L1 norm, p is equal to 2 for L2 norm, etc.).

In various embodiments, the training engine 160 dynamically varies the regularization parameter(s) during training based on a complexity reduction target 154. The training engine 160 may acquire any type of complexity reduction target 154 and vary the regularization parameter(s) in any technically feasible fashion. For instance, in some embodiments, the training engine 160 sets the complexity reduction target 154 equal to a target number of filters to be pruned per layer, a target pruning ratio, or a target inference time received via a GUI (not shown). As the training engine 160 performs training operations, the training engine 160 (re)-determines a dynamic regularization parameter designed to achieve the complexity reduction target 154 based on the current filter weights. In one embodiment, the training engine 160 (re)-adjusts each of the regularization parameters included in the regularization parameter set 152 based on the dynamic regularization parameter. Advantageously, dynamically adjusting the regularization parameter(s) indirectly fine-tunes the trained neural network 190 to meet one or more target goals.

In one embodiment, the, the filter pruning engine 170 identifies one or more filters included in the intermediate neural network 162 having average magnitudes lower than a pruning threshold 164. The filter pruning engine 170 may compute an average magnitude for each of the filters in any technically feasible fashion. The average magnitude computed by the filter pruning engine 170 may or may not be consistent with the regularization loss term $R(W)$ implemented in the training engine 160. For instance, in some embodiments, the regularization loss term $R(W)$ is based on the L1 norm and the filter pruning engine 170 sets the average magnitude for a given filter equal to the L2 norm of the filter.

In one embodiment, for each filter included in the intermediate neural network 162, the filter pruning engine 170 compares the associated average magnitude to the pruning threshold 164. If the average magnitude is lower than the pruning threshold 164, then the filter pruning engine 170 adds the filter to a pruning list (not shown). Otherwise, the filter pruning engine 170 omits the filter from the pruning list. The average magnitude is also referred to herein as a "weight metric."

In various embodiments, the filter pruning engine 170 re-evaluates each filter included in the pruning list based on any number and type of architectural constraints 166. The filter pruning engine 180 removes any number of the filters (including zero) from the pruning list based on the re-evaluation. Each architectural constraint 166 specifies a characteristic of the software and/or hardware architecture associated with any number of target deployments, such as the client computing subsystem 126. The filter pruning engine 170 may acquire and implement any number of architectural constraints 166 (including zero) in any technically feasible fashion.

For example, suppose that the software and/or hardware architecture associated with the client computing subsystem 126 were to be optimized for numbers of channels that are multiples of eight. The filter pruning engine 170 could modify the pruning list to ensure that the number of filters remaining in each convolutional layer after pruning is a multiple of eight. In another example, suppose that the software or hardware architecture associated with the client computing subsystem 126 were to be optimized for numbers of channels that are powers of two. The filter pruning engine 170 could modify the pruning list to ensure that the number of filters remaining in each convolutional layer after pruning is a power of two.

In one embodiment, after finalizing the pruning list, the filter pruning engine 170 modifies the intermediate neural network 162 to generate the pruned neural network 172. In some embodiments, the filter pruning engine 170 performs bias propagation. In bias propagation, the filter pruning engine 170 evaluates each convolutional layer in a sequential order in conjunction with the pruning list to modify the biases. More precisely, for a current layer, the pruning engine 170 computes equivalent biases on the subsequent layer based on the "pruned" biases associated with the filters included in both the pruning list and the current layer. The filter pruning engine 170 adds the equivalent biases to the subsequent layer.

In one embodiment, the filter pruning engine 170 may compute an equivalent bias in any technically feasible fashion. For instance, in some embodiments, computing the equivalent bias may involve feeding the pruned bias associated with the current layer through the activation function of the current layer and convolving it using the weights of the subsequent layer. Note that the convolution often reduces to a simple sum as the pruned bias is a constant. In some embodiments, the filter pruning engine 170 approximates the impact of removing the pruned biases because an exact solution is not possible. For example, for deconvolutions in which the channels are upsampled, the solution is not exact. In another example, for normal convolutions having the "same" border mode (i.e., having zeros padded at the borders to keep the channel spatial size the same), the solution is not exact at the borders.

In one embodiment, the filter pruning engine 170 removes each filter included in the pruning list from the intermediate neural network 162. In some embodiments, removing a filter involves directly changing the overall structure of the intermediate neural network 162. In other embodiments, removing a filter involves setting each of the weights and biases associated with the filter equal to zero. For each "pruned" filter included in the pruning list, the filter pruning engine 170 also removes any associated kernels included in the subsequent layer from the intermediate neural network 162. More precisely, the filter pruning engine 170 removes the kernels that operate on the channel corresponding to the pruned filter from the intermediate neural network 162. The filter pruning engine 170 sets the pruned neural network 172 equal to the modified intermediate neural network 162. In alternate embodiments, the filter pruning engine 170 may perform bias propagation, filter removal, and kernel removal in any order in any technically feasible fashion. In some embodiments, the filter pruning engine 170 may omit one or both of bias propagation and kernel removal.

In one embodiment, the re-training engine 180 implements any number and type of machine learning techniques (e.g., gradient descent) without regularization to train the pruned neural network 172, thereby generating the trained neural network 190. In alternate embodiments, the re-training engine 180 may implement any number and type of machine learning techniques with regularization to train the pruned neural network 172. In some such embodiments, the regularization implemented by the re-training engine 180 may be weaker than the regularization implemented by the training engine 160. Advantageously, when the filter pruning engine 170 implements bias propagation, the time required for the re-training engine 180 to train the pruned neural network 170 is reduced. Otherwise, the re-training engine 180 would typically perform computations similar to computations already performed by the training engine 160. Further, because entire filters are removed from the pruned neural network 170, the computation resources required for inference purposes are reduced irrespective of the hardware and software capabilities associated with the deployment, such as the client computing subsystem 126.

In one embodiment, a training data store (not shown) stores training data and parameters related to training and/or pruning the neural networks. In one embodiment, the parameters are used by the training engine 160 during the training of the source neural network 130, the filter pruning engine 170 during the pruning of the intermediate neural network 162, and/or the re-training engine 180 during the re-training of the pruned neural network 172. The parameters may include, but are not limited to, the number of layers, the number of filters per layer, the number of kernels per filter, the number of training iterations, the number of hidden layers, the learning rate, etc.

In one embodiment, the server computing subsystem 124 stores the neural network 190 generated by the training computing system 102. In one embodiment, the server computing subsystem 124 includes or is otherwise implemented by one or more server computing devices. In instances in which the server computing subsystem 124 includes multiple server computing devices, such server computing devices can operate according to sequential computing architectures, parallel computing architectures, or some combination thereof. In one embodiment, the server computing subsystem 124 may be a part of the training computing subsystem 102.

In one embodiment, the client computing subsystem 126 receives the trained neural network 190 from the server computing subsystem 124. In this fashion, the trained neural network 190 is deployed for inference purposes. The client computing subsystem 126 is also referred to herein as a deployment of the trained neural network 190. The client computing subsystem 126 may implement one or software applications that use or otherwise process the trained neural network 190 received from the server computing subsystem 124 to perform operations. These operations include, but are not limited to, classification operations, computer vision operations, and anomaly detection operations. In one embodiment, the client computing subsystem 126 is an autonomous vehicle. In another embodiment, the client computing subsystem 126 is a mobile computing device, such as a smartphone or a smartwatch.

The network 122 can be any type of communications network, such as a local area network (e.g., intranet), wide area network (e.g., Internet), or some combination thereof and can include any number of wired or wireless links. Communication over the network 122 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Note that the techniques described herein are illustrative rather than restrictive, and may be altered without departing from the broader spirit and scope of the disclosure. Many modifications and variations on the functionality provided by the training application 140, the complexity analysis engine 150, the training engine 160, the filter pruning engine 170, and the re-training engine 180 will be apparent to those of ordinary skill in the art without departing from the scope and spirit of the described embodiments. For instance, in some embodiments, one or more techniques may be implemented while other techniques may be omitted. Further, for explanatory purposes only, the training application 140 is described in the context of neural networks that implement a specific CNN architecture. However, as a general matter, the techniques outlined herein are applicable to pruning discrete groups of weights from any type of neural network trained using any type of regularization.

It will be appreciated that the system 102 shown herein is illustrative and that variations and modifications are possible. For example the functionality provided by the training application 140, the complexity analysis engine 150, the training engine 160, the filter pruning engine 170, and the re-training engine 180 as described herein may be integrated into or distributed across any number of software applications (including one), and any number of components of the system 102. Further, the connection topology between the various units in FIG. 1 may be modified as desired.

Pruning Neural Networks After Training with Regularization

Figure 2A:
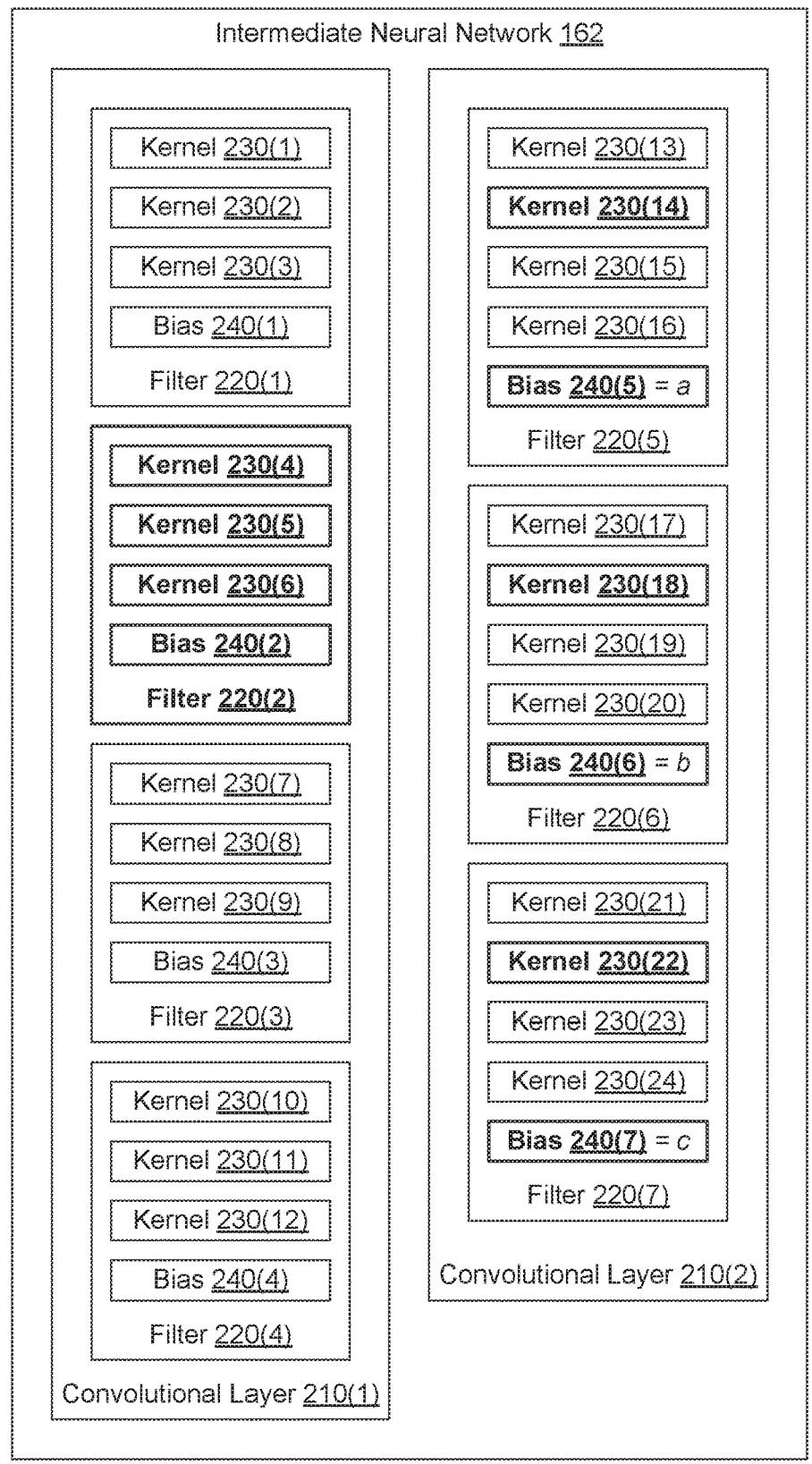
FIG. 2A illustrates an example of the intermediate neural network of FIG. 1, according to various embodiments.

FIG. 2A illustrates an example of the intermediate neural network 162 of FIG. 1, according to various embodiments. As shown, the intermediate neural network 162 includes, without limitation, two convolutional layers 210(1)-210(2). The convolutional layer 210(1) includes, without limitation, four filters 220(1)-220(4). By contrast, the convolutional layer 210(2) includes, without limitation, three filters 220(5)-220(7) Each of the filters 220 includes, without limitation, four different kernels 230 and a different bias 240. Although not shown, each of the filters 220 includes any number of weights.

In various embodiments, the intermediate neural network 162 may include any number of convolutional layers 210, each convolutional layer 210 may include any number of filters 220, and each filter 220 may include any number of kernels 230 and any number of biases 240. Further, the number of filters 220 may vary between convolutional layers 210, the number of kernels 230 included in each filter 220 may vary between convolutional layers 210, and the number of weights included in each kernel 230 may vary between filters 220. In general, the intermediate neural network 162 may include any number of convolutional layers 210, any number of weights, and any number of biases 240 structured in any technically feasible fashion.

For explanatory purposes only, portions of the intermediate neural network 162 that the filter pruning engine 170 modifies are depicted in bold. More precisely, the filter pruning engine 170 generates the pruning list that includes a single filter 220(2) included in the convolutional layer 210(1). The filter pruning engine 170 modifies the biases 240(5)-240(7) included in the filters 220(5)-220(7) of the convolutional layer 210(2) based on the bias 240(2) included in the filter 220(2). The filter pruning engine 170 removes the filter 220(2) from the convolutional layer 210(1).

In one embodiment, the filter pruning engine 170 removes the kernels 230 included in the convolutional layer 210(2) that previously operated on the channel corresponding to the pruned filter 220(2) previously included in the intermediate neural network 162. More precisely, the filter pruning engine 170 removes the kernel 230(14) from the filter 220(5), the kernel 230(18) from the filter 220(6), and the kernel 230(22) from the filter 220(7). The filter pruning engine 170 sets the pruned neural network 172 equal to the modified intermediate neural network 162.

In one embodiment, the filter pruning engine 170 may generate a pruning list that includes any number of filters 220 included in any number of the convolutional layers 210. Based on the pruning list, the filter pruning engine 170 may modify any number of biases 240, remove any number of filters 230, and remove any number of kernels 240 from the intermediate neural network 162 to generate the pruned neural network 172.

Figure 2B:
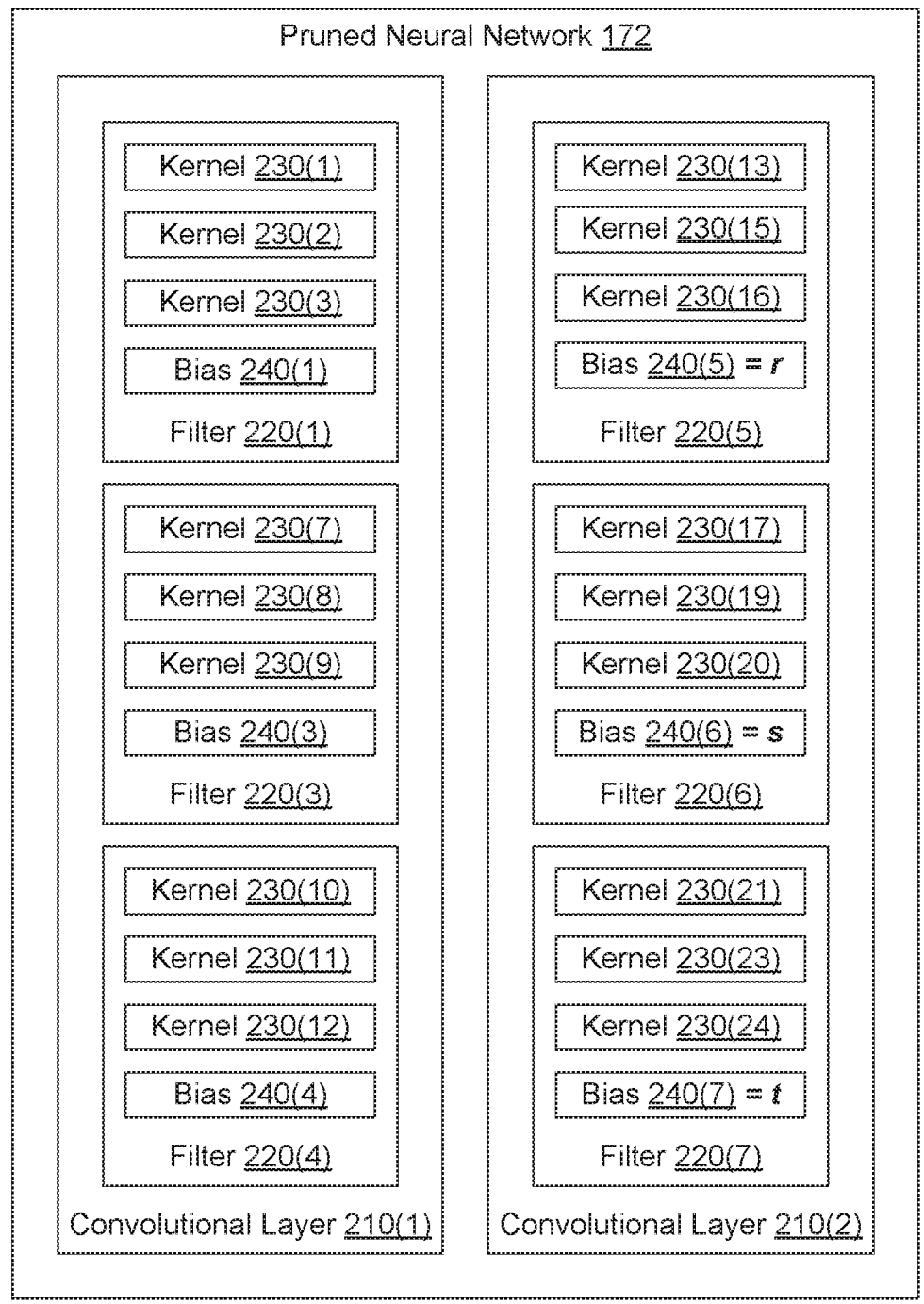
FIG. 2B illustrates an example of the pruned neural network of FIG. 1, according to various embodiments.

FIG. 2B illustrates an example of the pruned neural network 172 of FIG. 1, according to various embodiments. For explanatory purposes only, the pruned neural network 172 is generated by the filter pruning engine 170 based on the intermediate neural network 162 depicted in FIG. 2A. As described in conjunction with FIG. 2A, the pruned neural network 172 includes, without limitation, the two convolutional layers 210(1)-210(2). The filter pruning engine 170 removes the filter 220(2) from the convolutional layer 210(1). Consequently, the convolutional layer 210(1) includes, without limitation, the three remaining filters 220(1), 220(3), and 220(4). The filter pruning engine 170 removes one of the kernels 230 from each of the filters 220(5)-220(7) included in the convolutional layer 220(2). Consequently, each of the filters 220(5)-220(7) includes, without limitation, three remaining kernels 230. Further, each of the biases 240(5)-240(7) reflects the equivalent bias associated with the biases 240(2).

Figure 3:
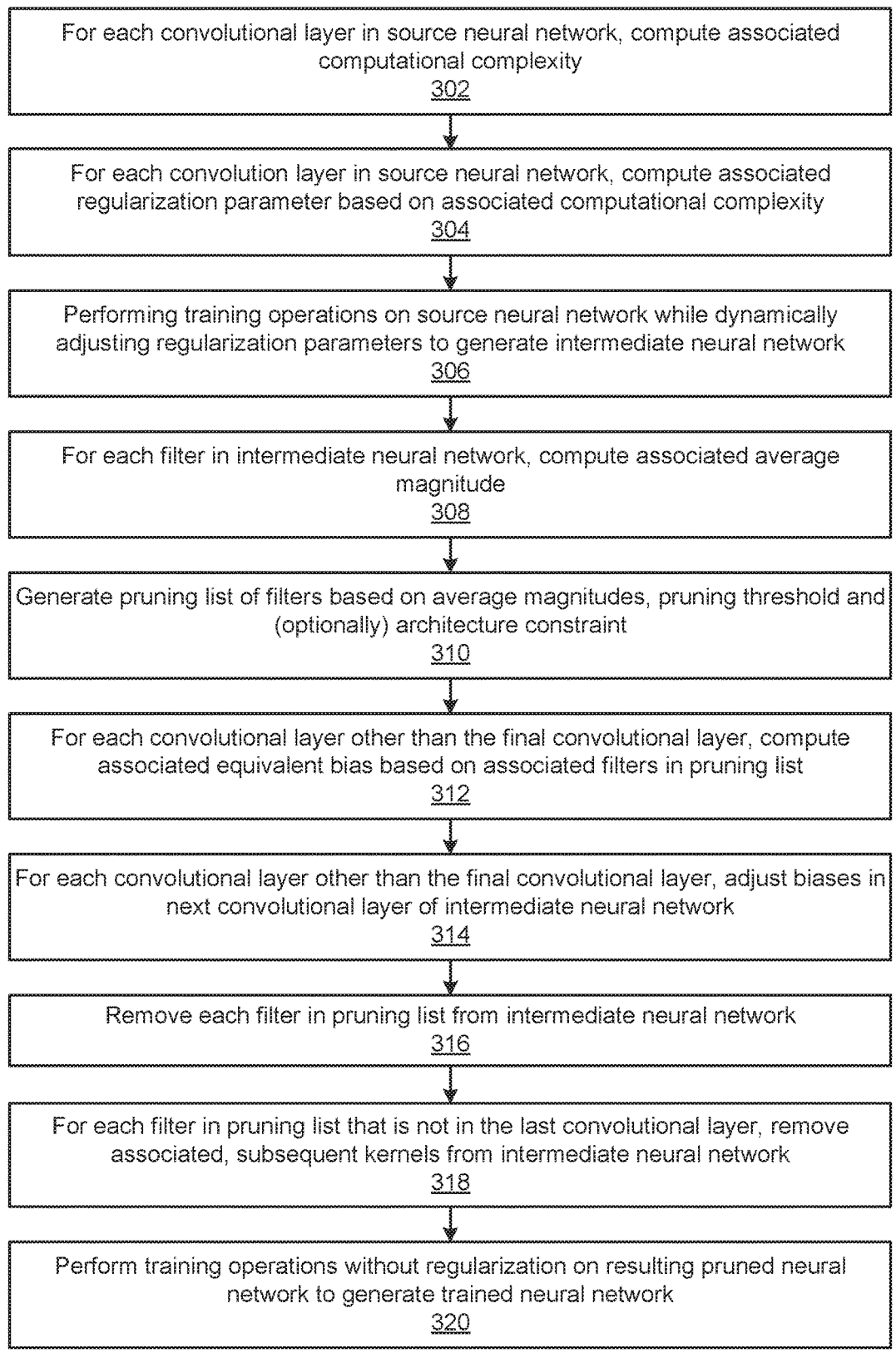
FIG. 3 is a flow diagram of method steps for generating a trained neural network, according to various embodiments.

FIG. 3 is a flow diagram of method steps for generating a trained neural network, according to various embodiments. Although the method steps are described in conjunction with the systems of FIGS. 1 and 2, persons skilled in the art will understand that any system configured to perform the method steps in any order falls within the scope of the present disclosure.

The method 300 begins at step 302, where, for each convolutional layer 210 included the source neural network 130, the complexity analysis engine 150 computes an associated computational complexity. At step 304, for each convolutional layer 210 included in the source neural network 130, the complexity analysis engine 150 computes an associated regularization parameter included in the regularization parameter set 152 based on the associated computational complexity. At step 306, the training engine 160 performs training operations on the source neural network 130 while dynamically adjusting the regularization parameters to generate the intermediate neural network 162.

At step 308, for each filter 220 included in the intermediate neural network 162, the filter pruning engine 170 computes the associated average magnitude. At step 310, the filter pruning engine 170 generates the pruning list that includes any number of the filters 220 based on the average magnitudes, the pruning threshold 164, and (optionally) any number of architectural constraints 166.

At step 312, for each convolutional layer 210 included in the intermediate neural network 162 other than the final convolutional layer 210, the filter pruning engine 170 computes an associated equivalent bias based on associated filters 220 included in the pruning list. At step 314, for each convolutional layer 210($x$) included in the intermediate neural network 162 other than the final convolutional layer 210, the filter pruning engine 170 adjusts the biases 240 included in the subsequent convolutional layer 210($x$+1). More precisely, the filter pruning engine 170 adjusts the biases 240 included in the subsequent convolutional layer 210($x$+1) of the intermediate neural network 162 based on the equivalent biases associated with the convolutional layer 210($x$).

At step 316, the filter pruning engine 170 removes each filter 220 included in the pruning list from the intermediate neural network 162. At step 318, for each filter 220 in the pruning list that is not in the last convolutional layer 210, the filter pruning engine 170 removes the associated kernels 230 from the subsequent convolutional layer 210 of the intermediate neural network 162. At step 320, the re-training engine 180 performs training operations without regularization on the resulting pruned neural network 172 to generate the trained neural network 190.

Hardware Architecture

Figure 4:
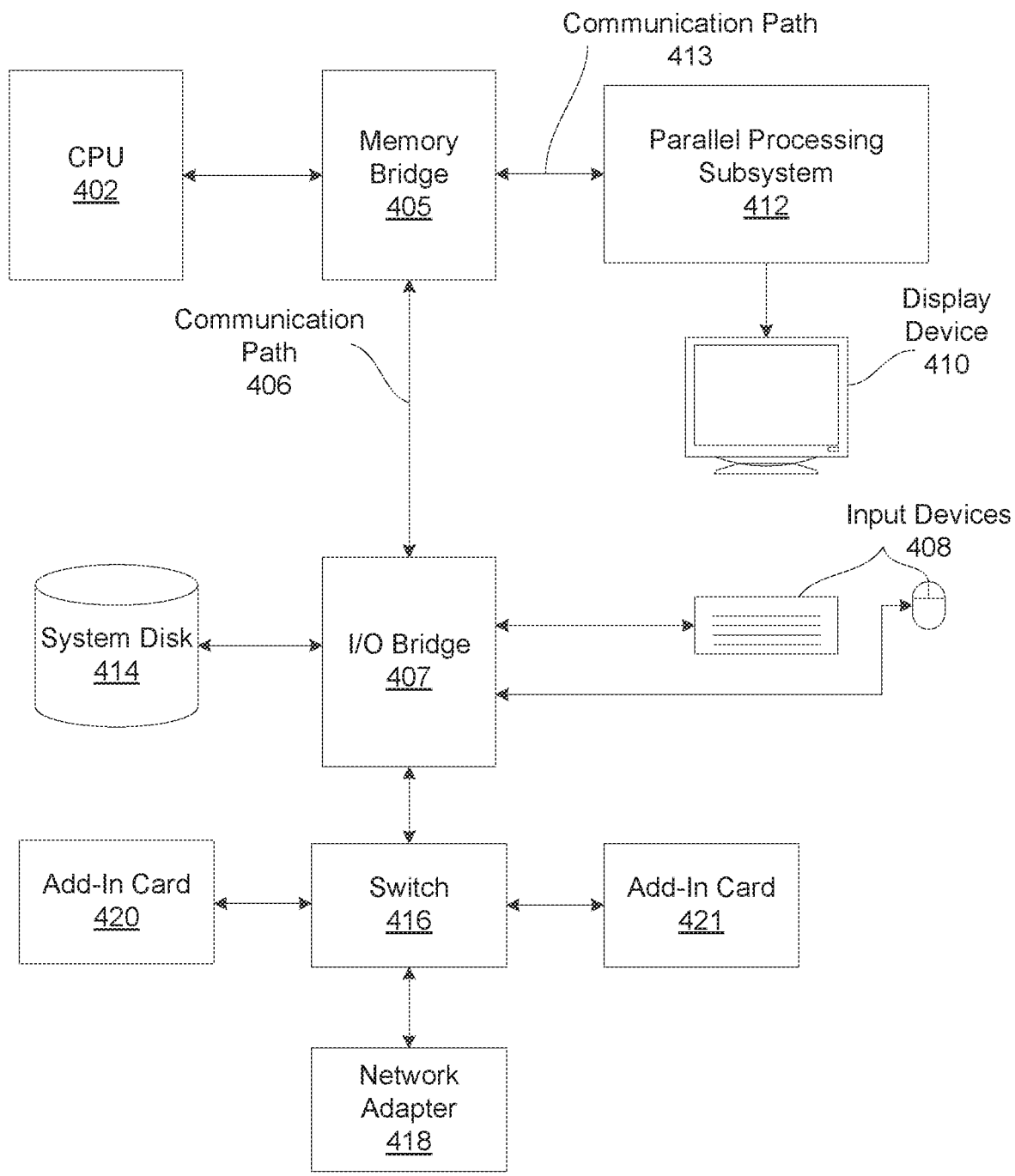
FIG. 4 is a block diagram illustrating a computer system configured to implement one or more aspects of various embodiments.

FIG. 4 is a block diagram illustrating a computer system 400 configured to implement one or more aspects of the present disclosure. In some embodiments, computer system 400 is a server machine operating in a data center or a cloud computing environment that provides scalable computing resources as a service over a network. For example, computer system 400 may be implemented in the training computing subsystem 102, the server computing subsystem 124, and/or the client computing subsystem 126.

In various embodiments, computer system 400 includes, without limitation, a central processing unit (CPU) 402 and a system memory 404 coupled to a parallel processing subsystem 412 via a memory bridge 405 and a communication path 413. Memory bridge 405 is further coupled to an I/O (input/output) bridge 407 via a communication path 406, and I/O bridge 407 is, in turn, coupled to a switch 416.

In one embodiment, I/O bridge 407 is configured to receive user input information from optional input devices 408, such as a keyboard or a mouse, and forward the input information to CPU 402 for processing via communication path 406 and memory bridge 405. In some embodiments, computer system 400 may be a server machine in a cloud computing environment. In such embodiments, computer system 400 may not have input devices 408. Instead, computer system 400 may receive equivalent input information by receiving commands in the form of messages transmitted over a network and received via the network adapter 418. In one embodiment, switch 416 is configured to provide connections between I/O bridge 407 and other components of the computer system 400, such as a network adapter 418 and various add-in cards 420 and 421.

In one embodiment, I/O bridge 407 is coupled to a system disk 414 that may be configured to store content and applications and data for use by CPU 402 and parallel processing subsystem 412. In one embodiment, system disk 414 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 407 as well.

In various embodiments, memory bridge 405 may be a Northbridge chip, and I/O bridge 407 may be a Southbridge chip. In addition, communication paths 406 and 413, as well as other communication paths within computer system 400, may be implemented using any technically suitable protocols, including, without limitation, AGP (Accelerated Graphics Port), HyperTransport, or any other bus or point-to-point communication protocol known in the art.

In some embodiments, parallel processing subsystem 412 comprises a graphics subsystem that delivers pixels to an optional display device 410 that may be any conventional cathode ray tube, liquid crystal display, light-emitting diode display, or the like. In such embodiments, the parallel processing subsystem 412 incorporates circuitry optimized for graphics and video processing, including, for example, video output circuitry. As described in greater detail below in conjunction with FIGS. 5 and 6, such circuitry may be incorporated across one or more parallel processing units (PPUs), also referred to herein as parallel processors, included within parallel processing subsystem 412. In other embodiments, the parallel processing subsystem 412 incorporates circuitry optimized for general purpose and/or compute processing. Again, such circuitry may be incorporated across one or more PPUs included within parallel processing subsystem 412 that are configured to perform such general purpose and/or compute operations. In yet other embodiments, the one or more PPUs included within parallel processing subsystem 412 may be configured to perform graphics processing, general purpose processing, and compute processing operations. System memory 404 includes at least one device driver configured to manage the processing operations of the one or more PPUs within parallel processing subsystem 412.

In various embodiments, parallel processing subsystem 412 may be integrated with one or more of the other elements of FIG. 4 to form a single system. For example, parallel processing subsystem 412 may be integrated with CPU 402 and other connection circuitry on a single chip to form a system on chip (SoC).

In one embodiment, CPU 402 is the master processor of computer system 400, controlling and coordinating operations of other system components. In one embodiment, CPU 402 issues commands that control the operation of PPUs. In some embodiments, communication path 413 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 402, and the number of parallel processing subsystems 412, may be modified as desired. For example, in some embodiments, system memory 404 could be connected to CPU 402 directly rather than through memory bridge 405, and other devices would communicate with system memory 404 via memory bridge 405 and CPU 402. In other embodiments, parallel processing subsystem 412 may be connected to I/O bridge 407 or directly to CPU 402, rather than to memory bridge 405. In still other embodiments, I/O bridge 407 and memory bridge 405 may be integrated into a single chip instead of existing as one or more discrete devices. Lastly, in certain embodiments, one or more components shown in FIG. 4 may not be present. For example, switch 416 could be eliminated, and network adapter 418 and add-in cards 420, 421 would connect directly to I/O bridge 407.

Figure 5:
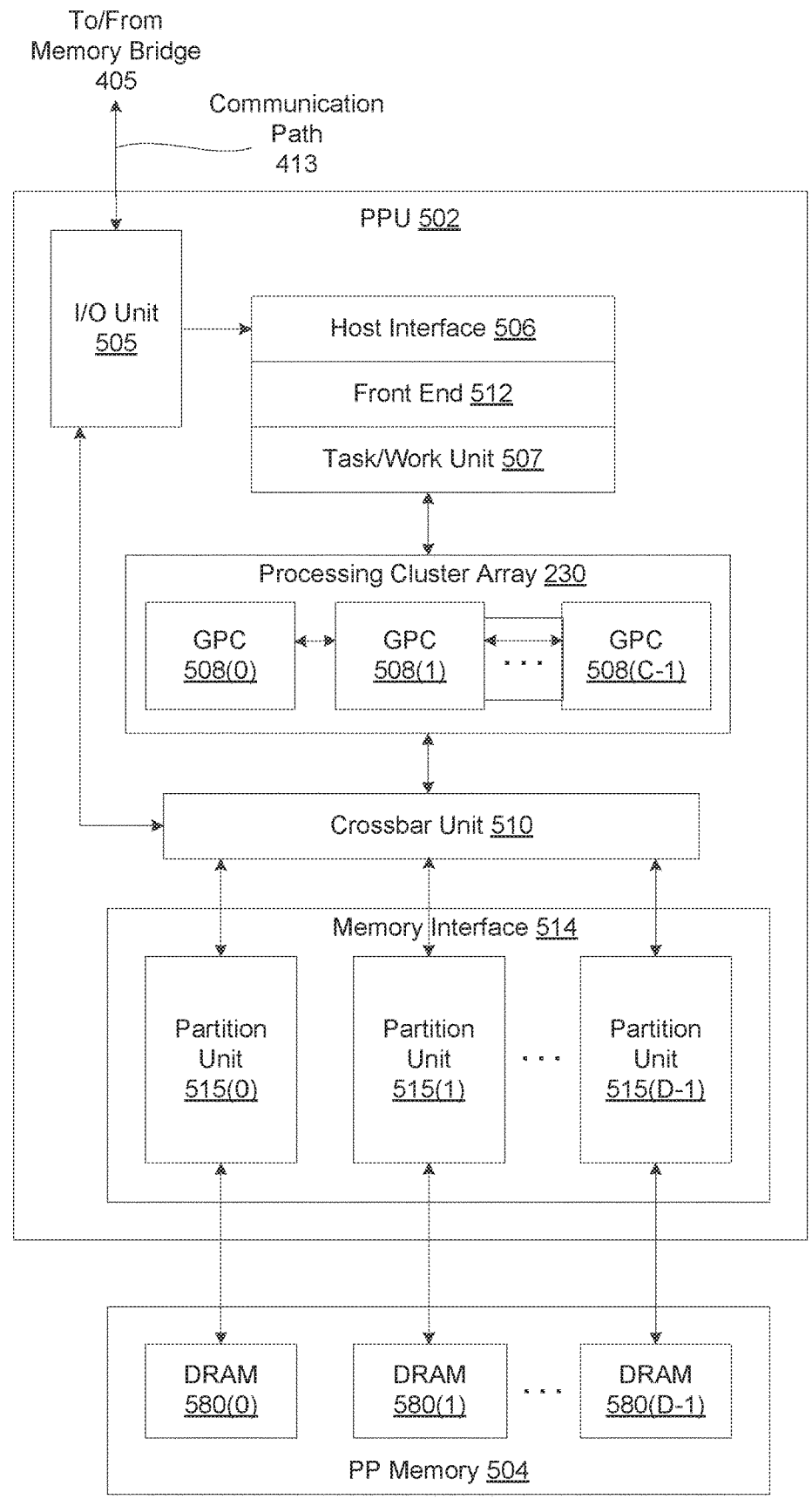
FIG. 5 is a block diagram of a parallel processing unit (PPU) included in the parallel processing subsystem of FIG. 4, according to various embodiments.

FIG. 5 is a block diagram of a parallel processing unit (PPU) 502 included in the parallel processing subsystem 412 of FIG. 4, according to various embodiments. Although FIG. 5 depicts one PPU 502, as indicated above, parallel processing subsystem 412 may include any number of PPUs 502. As shown, PPU 502 is coupled to a local parallel processing (PP) memory 504. PPU 502 and PP memory 504 may be implemented using one or more integrated circuit devices, such as programmable processors, application specific integrated circuits (ASICs), or memory devices, or in any other technically feasible fashion.

In some embodiments, PPU 502 comprises a graphics processing unit (GPU) that may be configured to implement a graphics rendering pipeline to perform various operations related to generating pixel data based on graphics data supplied by CPU 402 and/or system memory 404. When processing graphics data, PP memory 504 can be used as graphics memory that stores one or more conventional frame buffers and, if needed, one or more other render targets as well. Among other things, PP memory 504 may be used to store and update pixel data and deliver final pixel data or display frames to an optional display device 410 for display. In some embodiments, PPU 502 also may be configured for general-purpose processing and compute operations. In some embodiments, computer system 400 may be a server machine in a cloud computing environment. In such embodiments, computer system 400 may not have a display device 410. Instead, computer system 400 may generate equivalent output information by transmitting commands in the form of messages over a network via the network adapter 418.

In some embodiments, CPU 402 is the master processor of computer system 400, controlling and coordinating operations of other system components. In one embodiment, CPU 402 issues commands that control the operation of PPU 502. In some embodiments, CPU 402 writes a stream of commands for PPU 502 to a data structure (not explicitly shown in either FIG. 4 or FIG. 5) that may be located in system memory 404, PP memory 504, or another storage location accessible to both CPU 402 and PPU 502. A pointer to the data structure is written to a command queue, also referred to herein as a pushbuffer, to initiate processing of the stream of commands in the data structure. In one embodiment, the PPU 502 reads command streams from the command queue and then executes commands asynchronously relative to the operation of CPU 402. In embodiments where multiple pushbuffers are generated, execution priorities may be specified for each pushbuffer by an application program via device driver to control scheduling of the different pushbuffers.

In one embodiment, PPU 502 includes an I/O (input/output) unit 505 that communicates with the rest of computer system 400 via the communication path 413 and memory bridge 405. In one embodiment, I/O unit 505 generates packets (or other signals) for transmission on communication path 413 and also receives all incoming packets (or other signals) from communication path 413, directing the incoming packets to appropriate components of PPU 502. For example, commands related to processing tasks may be directed to a host interface 506, while commands related to memory operations (e.g., reading from or writing to PP memory 504) may be directed to a crossbar unit 510. In one embodiment, host interface 506 reads each command queue and transmits the command stream stored in the command queue to a front end 512.

As mentioned above in conjunction with FIG. 4, the connection of PPU 502 to the rest of computer system 400 may be varied. In some embodiments, parallel processing subsystem 412, which includes at least one PPU 502, is implemented as an add-in card that can be inserted into an expansion slot of computer system 400. In other embodiments, PPU 502 can be integrated on a single chip with a bus bridge, such as memory bridge 405 or I/O bridge 407. Again, in still other embodiments, some or all of the elements of PPU 502 may be included along with CPU 402 in a single integrated circuit or system on chip (SoC).

In one embodiment, front end 512 transmits processing tasks received from host interface 506 to a work distribution unit (not shown) within task/work unit 507. In one embodiment, the work distribution unit receives pointers to processing tasks that are encoded as task metadata (TMD) and stored in memory. The pointers to TMDs are included in a command stream that is stored as a command queue and received by the front end unit 512 from the host interface 506. Processing tasks that may be encoded as TMDs include indices associated with the data to be processed as well as state parameters and commands that define how the data is to be processed. For example, the state parameters and commands could define the program to be executed on the data. Also, for example, the TMD could specify the number and configuration of the set of CTAs. Generally, each TMD corresponds to one task. The task/work unit 507 receives tasks from the front end 512 and ensures that GPCs 508 are configured to a valid state before the processing task specified by each one of the TMDs is initiated. A priority may be specified for each TMD that is used to schedule the execution of the processing task. Processing tasks also may be received from the processing cluster array 530. Optionally, the TMD may include a parameter that controls whether the TMD is added to the head or the tail of a list of processing tasks (or to a list of pointers to the processing tasks), thereby providing another level of control over execution priority.

In one embodiment, PPU 502 implements a highly parallel processing architecture based on a processing cluster array 530 that includes a set of C general processing clusters (GPCs) 508, where C≥1. Each GPC 508 is capable of executing a large number (e.g., hundreds or thousands) of threads concurrently, where each thread is an instance of a program. In various applications, different GPCs 508 may be allocated for processing different types of programs or for performing different types of computations. The allocation of GPCs 508 may vary depending on the workload arising for each type of program or computation.

In one embodiment, memory interface 514 includes a set of D of partition units 515, where D≥1. Each partition unit 515 is coupled to one or more dynamic random access memories (DRAMs) 520 residing within PPM memory 504. In some embodiments, the number of partition units 515 equals the number of DRAMs 520, and each partition unit 515 is coupled to a different DRAM 520. In other embodiments, the number of partition units 515 may be different than the number of DRAMs 520. Persons of ordinary skill in the art will appreciate that a DRAM 520 may be replaced with any other technically suitable storage device. In operation, various render targets, such as texture maps and frame buffers, may be stored across DRAMs 520, allowing partition units 515 to write portions of each render target in parallel to efficiently use the available bandwidth of PP memory 504.

In one embodiment, a given GPC 508 may process data to be written to any of the DRAMs 520 within PP memory 504. In one embodiment, crossbar unit 510 is configured to route the output of each GPC 508 to the input of any partition unit 515 or to any other GPC 508 for further processing. GPCs 508 communicate with memory interface 514 via crossbar unit 510 to read from or write to various DRAMs 520. In some embodiments, crossbar unit 510 has a connection to I/O unit 505, in addition to a connection to PP memory 504 via memory interface 514, thereby enabling the processing cores within the different GPCs 508 to communicate with system memory 404 or other memory not local to PPU 502. In the embodiment of FIG. 5, crossbar unit 510 is directly connected with I/O unit 505. In various embodiments, crossbar unit 510 may use virtual channels to separate traffic streams between the GPCs 508 and partition units 515.

In one embodiment, GPCs 508 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 502 is configured to transfer data from system memory 404 and/or PP memory 504 to one or more on-chip memory units, process the data, and write result data back to system memory 404 and/or PP memory 504. The result data may then be accessed by other system components, including CPU 402, another PPU 502 within parallel processing subsystem 412, or another parallel processing subsystem 412 within computer system 400.

In one embodiment, any number of PPUs 502 may be included in a parallel processing subsystem 412. For example, multiple PPUs 502 may be provided on a single add-in card, or multiple add-in cards may be connected to communication path 413, or one or more of PPUs 502 may be integrated into a bridge chip. PPUs 502 in a multi-PPU system may be identical to or different from one another. For example, different PPUs 502 might have different numbers of processing cores and/or different amounts of PP memory 504. In implementations where multiple PPUs 502 are present, those PPUs may be operated in parallel to process data at a higher throughput than is possible with a single PPU 502. Systems incorporating one or more PPUs 502 may be implemented in a variety of configurations and form factors, including, without limitation, desktops, laptops, handheld personal computers or other handheld devices, servers, workstations, game consoles, embedded systems, and the like.

Figure 6:
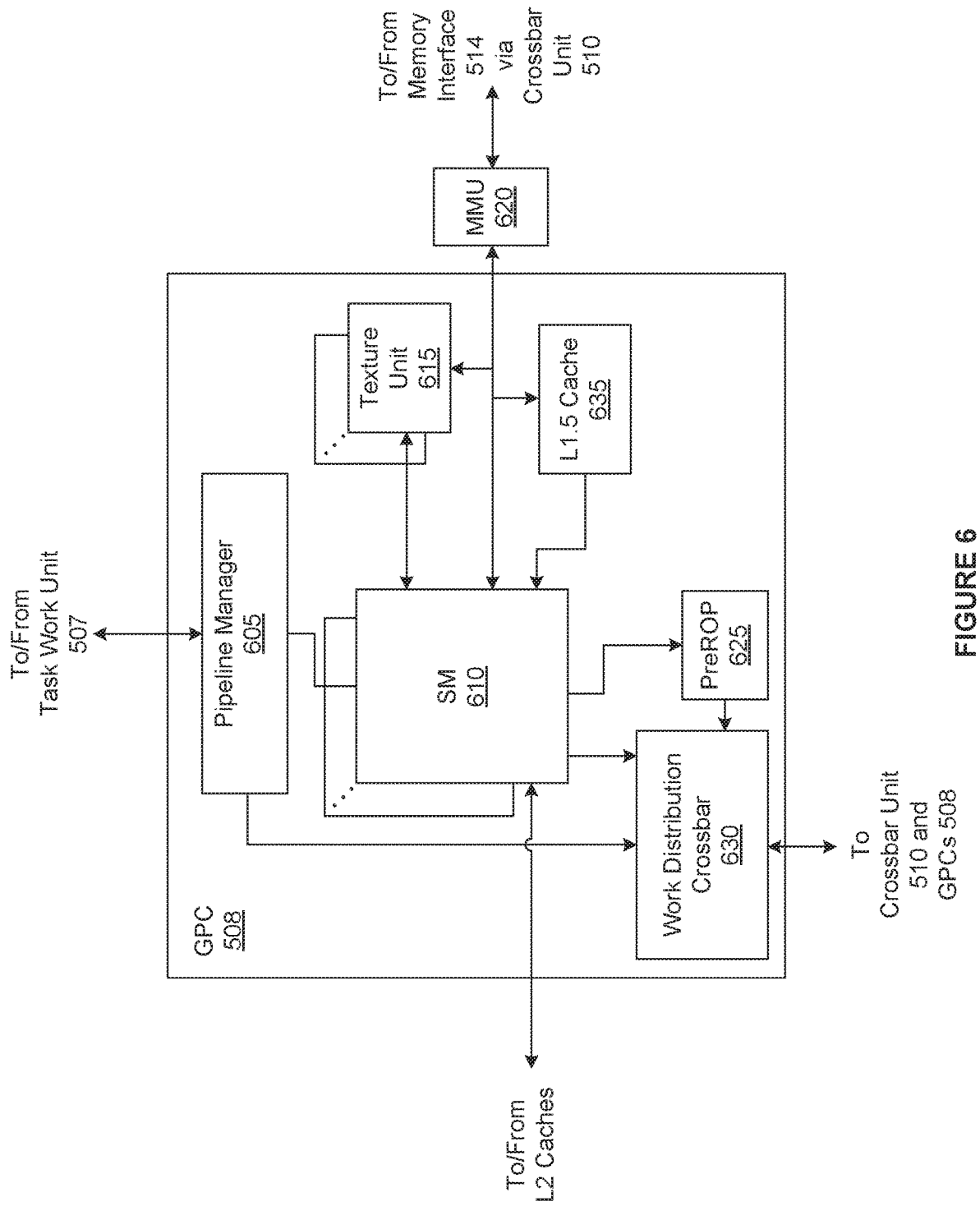
FIG. 6 is a block diagram of a general processing cluster (GPC) included in the parallel processing unit (PPU) of FIG. 5, according to various embodiments.

FIG. 6 is a block diagram of a general processing cluster (GPC) 508 included in the parallel processing unit (PPU) 502 of FIG. 5, according to various embodiments. As shown, the GPC 508 includes, without limitation, a pipeline manager 605, one or more texture units 615, a preROP unit 625, a work distribution crossbar 630, and an L1.5 cache 635.

In one embodiment, GPC 508 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 508. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 508 is controlled via a pipeline manager 605 that distributes processing tasks received from a work distribution unit (not shown) within task/work unit 507 to one or more streaming multiprocessors (SMs) 610. Pipeline manager 605 may also be configured to control a work distribution crossbar 630 by specifying destinations for processed data output by SMs 610.

In various embodiments, GPC 508 includes a set of M of SMs 610, where M 1. Also, each SM 610 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 610 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In various embodiments, each SM 610 includes multiple processing cores. In one embodiment, the SM 910 includes a large number (e.g., 128, etc.) of distinct processing cores. Each core may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 454-2008 standard for floating point arithmetic. In one embodiment, the cores include 64 single-precision (32-bit) floating point cores, 64 integer cores, 32 double-precision (64-bit) floating point cores, and 8 tensor cores.

In one embodiment, tensor cores configured to perform matrix operations, and, in one embodiment, one or more tensor cores are included in the cores. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use tensor cores from a CUDA-C++ program. At the CUDA level, the warp-level interface assumes 16×16 size matrices spanning all 32 threads of the warp.

Neural networks rely heavily on matrix math operations, and complex multi-layered networks require tremendous amounts of floating-point performance and bandwidth for both efficiency and speed. In various embodiments, with thousands of processing cores, optimized for matrix math operations, and delivering tens to hundreds of TFLOPS of performance, the SMs 610 provide a computing platform capable of delivering performance required for deep neural network-based artificial intelligence and machine learning applications.

In various embodiments, each SM 910 may also comprise multiple special function units (SFUs) that perform special functions (e.g., attribute evaluation, reciprocal square root, and the like). In one embodiment, the SFUs may include a tree traversal unit configured to traverse a hierarchical tree data structure. In one embodiment, the SFUs may include texture unit configured to perform texture map filtering operations. In one embodiment, the texture units are configured to load texture maps (e.g., a 2D array of texels) from memory and sample the texture maps to produce sampled texture values for use in shader programs executed by the SM. In various embodiments, each SM 910 also comprises multiple load/store units (LSUs) that implement load and store operations between the shared memory/L1 cache and register files internal to the SM 610.

In one embodiment, each SM 610 is configured to process one or more thread groups. As used herein, a "thread group" or "warp" refers to a group of threads concurrently executing the same program on different input data, with one thread of the group being assigned to a different execution unit within an SM 610. A thread group may include fewer threads than the number of execution units within the SM 610, in which case some of the execution may be idle during cycles when that thread group is being processed. A thread group may also include more threads than the number of execution units within the SM 610, in which case processing may occur over consecutive clock cycles. Since each SM 610 can support up to G thread groups concurrently, it follows that up to G*M thread groups can be executing in GPC 508 at any given time.

Additionally, in one embodiment, a plurality of related thread groups may be active (in different phases of execution) at the same time within an SM 610. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 610, and m is the number of thread groups simultaneously active within the SM 610. In some embodiments, a single SM 610 may simultaneously support multiple CTAs, where such CTAs are at the granularity at which work is distributed to the SMs 610.

In one embodiment, each SM 610 contains a level one (L1) cache or uses space in a corresponding L1 cache outside of the SM 610 to support, among other things, load and store operations performed by the execution units. Each SM 610 also has access to level two (L2) caches (not shown) that are shared among all GPCs 508 in PPU 502. The L2 caches may be used to transfer data between threads. Finally, SMs 610 also have access to off-chip "global" memory, which may include PP memory 504 and/or system memory 404. It is to be understood that any memory external to PPU 502 may be used as global memory. Additionally, as shown in FIG. 6, a level one-point-five (L1.5) cache 635 may be included within GPC 508 and configured to receive and hold data requested from memory via memory interface 514 by SM 610. Such data may include, without limitation, instructions, uniform data, and constant data. In embodiments having multiple SMs 610 within GPC 508, the SMs 610 may beneficially share common instructions and data cached in L1.5 cache 635.

In one embodiment, each GPC 508 may have an associated memory management unit (MMU) 620 that is configured to map virtual addresses into physical addresses. In various embodiments, MMU 620 may reside either within GPC 508 or within the memory interface 514. The MMU 620 includes a set of page table entries (PTEs) used to map a virtual address to a physical address of a tile or memory page and optionally a cache line index. The MMU 620 may include address translation lookaside buffers (TLB) or caches that may reside within SMs 610, within one or more L1 caches, or within GPC 508.

In one embodiment, in graphics and compute applications, GPC 508 may be configured such that each SM 610 is coupled to a texture unit 615 for performing texture mapping operations, such as determining texture sample positions, reading texture data, and filtering texture data.

In one embodiment, each SM 610 transmits a processed task to work distribution crossbar 630 in order to provide the processed task to another GPC 508 for further processing or to store the processed task in an L2 cache (not shown), parallel processing memory 504, or system memory 404 via crossbar unit 510. In addition, a pre-raster operations (preROP) unit 625 is configured to receive data from SM 610, direct data to one or more raster operations (ROP) units within partition units 515, perform optimizations for color blending, organize pixel color data, and perform address translations.

It will be appreciated that the architecture described herein is illustrative and that variations and modifications are possible. Among other things, any number of processing units, such as SMs 610, texture units 615, or preROP units 625, may be included within GPC 508. Further, as described above in conjunction with FIG. 5, PPU 502 may include any number of GPCs 508 that are configured to be functionally similar to one another so that execution behavior does not depend on which GPC 508 receives a particular processing task. Further, each GPC 508 operates independently of the other GPCs 508 in PPU 502 to execute tasks for one or more application programs.

In sum, a training application prunes filters of a source neural network during training to decrease the computational complexity of a resulting trained neural network. The resulting trained neural network may be used to perform inference operations. The training application includes, without limitation, a training engine, a filter pruning engine, a re-training engine, and, optionally, a complexity analysis engine. In some embodiments, the complexity analysis engine initially computes a different regularization weight for each layer in the source neural network based on the computational complexity of the layer. The training engine trains the source neural network with regularization to generate an intermediate neural network. Notably, in some embodiments, as part of training the source neural network, the training engine dynamically adjusts the regularization weight(s) based on a complexity reduction target.

The filter pruning engine adds each of the filters included in the intermediate neural network that has an average magnitude lower than a pruning threshold to a pruning list. In some embodiments, the filter pruning engine modifies the pruning list based on an architectural constraint associated with a target deployment architecture. In some embodiments, for each layer in the intermediate neural network, the filter pruning engine computes equivalent biases on the subsequent layer and adds the equivalent biases to the subsequent layer. For each filter included in the pruning list, the filter pruning engine removes the filter as well as the kernels in the subsequent convolutional layer that apply to the channel associated with the removed filter from the intermediate neural network to generate a pruned neural network. The re-training engine re-trains the pruned network without regularization to generate the trained neural network.

At least one technological advantage of the disclosed techniques is that the computational complexity of the pruned neural network is reduced while the accuracy of the pruned neural network is optimized. More precisely, because the neural network is trained using regularization, the accuracy degradation associated with removing entire filters is decreased relative to prior art filter-pruning techniques. Further, each of computing per-layer regularization parameters, dynamically adjusting regularization parameters, compensating for removed biases, and selecting the filters to be removed based on architectural constraints increases at least one of the efficiency of training, re-training, and the trained neural network. These technical advantages provide one or more technological advancements over the prior art.

1. In some embodiments, a neural network comprises a plurality of network layers that includes at least a first network layer and a second network layer, wherein the first network layer includes a first set of filters, and the second network layer includes a second set of filters, wherein a bias associated with a filter included in the second set of filters compensates for a bias associated with a filter included in the first set of filters that was removed from the first network layer.

2. The neural network of clause 1, wherein the first network layer has a first initial number of operations, and a first regularization parameter associated with the first network layer is based on the first initial number of operations, and wherein the second network layer has a second initial number of operations, and a second regularization parameter associated with the second network layer is based on the second initial number of operations.

3. The neural network of clause 1 or 2, wherein a first regularization parameter associated with the first network layer is based on a first inference time associated with the first network layer, and wherein a second regularization parameter associated with the second network layer is based on a second inference time associated with the second network layer.

4. The neural network of any of clauses 1-3, wherein the first network layer is associated with a regularization parameter that is dynamically adjusted during one or more training operations based on a complexity reduction target.

5. The neural network of any of clauses 1-4, wherein a first kernel included in the filter included in the second set of filters was removed from the second network layer in response to removing the filter included in the first set of filters.

6. The neural network of any of clauses 1-5, wherein the filter included in the first set of filters was removed from the first network layer based on performing one or more comparison operations between one of an L1 norm and an L2 norm of the filter included in the first set of filters and a pruning threshold.

7. The neural network of any of clauses 1-6, wherein the bias associated with the filter included in the second set of filters is computed based on propagating the bias associated with the filter included in the first set of filters through an activation function associated with the first network layer to generate an intermediate result and convolving the intermediate result based on a plurality of weights associated with the second set of filters.

8. The neural network of any of clauses 1-7, wherein the filter included in the first set of filters was removed from the neural network based on at least one of a hardware architecture and a software architecture associated with a deployment of the neural network.

9. The neural network of any of clauses 1-8, wherein the first network layer comprises a convolutional layer.

10. In some embodiments, a computer-implemented method comprises removing a filter from a first layer of a convolutional neural network (CNN) based on a weight metric associated with the filter falling below a pruning threshold, wherein the first layer is connected to a second layer of the CNN; and adjusting at least one bias associated with the second layer of the CNN based on a first bias associated with the filter.

11. The method of clause 10, wherein the CNN is trained using a plurality of regularization parameters, and wherein each of the plurality of regularization parameters corresponds to a different layer in the CNN and is determined based on a computational complexity of the corresponding layer.

12. The method of clause 10 or 11, wherein the CNN is trained using at least one regularization parameter that is dynamically adjusted based on a complexity reduction target.

13. The method of any of clauses 10-12, wherein adjusting the at least one bias comprises propagating the first bias through an activation function to generate an intermediate result; and convolving the intermediate result based on a plurality of weights associated with the second layer.

14. The method of any of clauses 10-13, wherein removing the filter comprises adding the filter to a first list of filters based on a weight metric associated with the filter falling below a pruning threshold; modifying the first list of filters based on at least one of a hardware architecture and a software architecture associated with a deployment of the CNN to generate a second list of filters that includes the filter; and removing each filter included in the second list of filters from the CNN.

15. The method of any of clauses 10-14, wherein the weight metric comprises an L1 norm or an L2 norm of a plurality of weights.

16. The method of any of clauses 10-15, further comprising removing a kernel from the second layer of the CNN in response to removing the filter from the first layer of the CNN.

17. In some embodiments, a system comprises one or more memories storing instructions; and one or more processors that are coupled to the one or more memories and, when executing the instructions, are configured to remove a filter from a first layer of a convolutional neural network (CNN) based on a weight metric associated with the filter falling below a pruning threshold, wherein the first layer is connected to a second layer of the CNN; and adjust at least one bias associated with the second layer of the CNN based on a first bias associated with the filter.

18. The system of cause 17, wherein the CNN is trained using a plurality of regularization parameters, and wherein each of the plurality of regularization parameters corresponds to a different layer in the CNN and is determined based on a computational complexity of the corresponding layer.

19. The system of clause 17 or 18, wherein the CNN is trained using at least one regularization parameter that is dynamically adjusted during the training based on a complexity reduction target.

20. The system of any of clauses 17-19, wherein the one or more processors are configured to remove the filter by adding the filter to a first list of filters based on a weight metric associated with the filter falling below a pruning threshold; modifying the first list of filters based on at least one of a hardware architecture and a software architecture associated with a deployment of the CNN to generate a second list of filters that includes the filter; and removing each filter included in the second list of filters from the CNN.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system, comprising:
one or more processors to perform one or more operations comprising:
processing data using a neural network to perform at least one of a classification operation, a computer vision operation, or an anomaly detection operation, wherein the neural network comprises: a plurality of network layers that includes at least a first network layer and a second network layer, wherein the first network layer includes a first set of filters, and the second network layer includes a second set of filters, and wherein a bias associated with a filter included in the second set of filters compensates for a bias associated with another filter that was removed from the first network layer during training of the neural network.

2. The system of claim 1, wherein the first network layer has a first initial number of operations, and a first regularization parameter associated with the first network layer is based on the first initial number of operations, and wherein the second network layer has a second initial number of operations, and a second regularization parameter associated with the second network layer is based on the second initial number of operations.

3. The system of claim 1, wherein a first regularization parameter associated with the first network layer is based on a first inference time associated with the first network layer, and wherein a second regularization parameter associated with the second network layer is based on a second inference time associated with the second network layer.

4. The system of claim 1, wherein the first network layer is associated with a regularization parameter that is dynamically adjusted during one or more training operations based on a complexity reduction target.

5. The system of claim 1, wherein a first kernel included in the filter included in the second set of filters was removed from the second network layer in response to removing the another filter.

6. The system of claim 1, wherein the another filter was removed from the first network layer based on performing one or more comparison operations between one of an L1 norm and an L2 norm of the another filter and a pruning threshold.

7. The system of claim 1, wherein the bias associated with the filter included in the second set of filters is computed based on propagating the bias associated with the another filter through an activation function associated with the first network layer to generate an intermediate result and convolving the intermediate result based on a plurality of weights associated with the second set of filters.

8. The system of claim 1, wherein the another filter was removed from the neural network based on at least one of a hardware architecture or a software architecture associated with a deployment of the neural network.

9. The system of claim 1, wherein the first network layer comprises a convolutional layer.

10. A computer-implemented method, comprising:
performing at least one of a classification operation, a computer vision operation, or an anomaly detection operation using a convolutional neural network (NN), wherein the NN comprises a plurality of network layers that includes at least a first network layer and a second network layer, wherein the first network layer includes a first set of filters, and the second network layer includes a second set of filters, and wherein a bias associated with a filter included in the second set of filters compensates for a bias associated with another filter that was removed from the first network layer during training of the NN.

11. The method of claim 10, wherein the NN is trained using a plurality of regularization parameters, and wherein each of the plurality of regularization parameters corresponds to a different layer in the CNN and is determined based on a computational complexity of the corresponding layer.

12. The method of claim 10, wherein the NN is trained using at least one regularization parameter that is dynamically adjusted based on a complexity reduction target.

13. The method of claim 10, further comprising adjusting the bias associated with the filter included in the second set of filters to compensate for the bias associated with the another filter, wherein adjusting the bias associated with the filter included in the second set of filters comprises:
   propagating the bias associated with the another filter through an activation function to generate an intermediate result; and
   convolving the intermediate result based on a plurality of weights associated with the second network layer.

14. The method of claim 10, wherein the another filter was removed by:
   adding the another filter to a first list of filters based on a weight metric associated with the another filter falling below a pruning threshold;
   modifying the first list of filters based on at least one of a hardware architecture or a software architecture associated with a deployment of the NN to generate a second list of filters that includes the another filter; and
   removing each filter included in the second list of filters from the CNN.

15. The method of claim 14, wherein the weight metric comprises an L1 norm or an L2 norm of a plurality of weights.

16. The method of claim 14, further comprising removing a kernel from the second network layer of the NN in response to removing the another filter from the first network layer of the NN.

17. A system, comprising:
   one or more processors to cause performance of operations comprising:
      performing at least one of a classification operation, a computer vision operation, or an anomaly detection operation using a neural network (NN), wherein the NN comprises a plurality of network layers that includes at least a first network layer and a second network layer, wherein the first network layer includes a first set of filters, and the second network layer includes a second set of filters, and wherein a bias associated with a filter included in the second set of filters compensates for a bias associated with another filter that was removed from the first network layer during training of the NN.

18. The system of claim 17, wherein the NN is trained using a plurality of regularization parameters, and wherein each of the plurality of regularization parameters corresponds to a different layer in the NN and is determined based on a computational complexity of the corresponding layer.

19. The system of claim 17, wherein the NN is trained using at least one regularization parameter that is dynamically adjusted during the training based on a complexity reduction target.

20. The system of claim 17, wherein the operations further comprise removing the another filter by:
   adding the another filter to a first list of filters based on a weight metric associated with the another filter falling below a pruning threshold;
   modifying the first list of filters based on at least one of a hardware architecture or a software architecture associated with a deployment of the NN to generate a second list of filters that includes the another filter; and
   removing each filter included in the second list of filters from the NN.

* * * * *